(12) United States Patent
Balasubramanian et al.

(10) Patent No.: US 11,392,445 B2
(45) Date of Patent: Jul. 19, 2022

(54) SYSTEM AND METHOD FOR SUPPORTING RESILIENCE IN IT ENVIRONMENT

(71) Applicant: Cognizant Technology Solutions India Pvt. Ltd., Chennai (IN)

(72) Inventors: Premkumar Balasubramanian, Frisco, TX (US); Shrinath Venkatsubramaniam, McKinney, TX (US); Sivakumar Kalyanaraman, Chennai (IN); Ramu Nallatamby, Puducherry (IN); Gautham Ravi, Frisco, TX (US)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 17/206,529

(22) Filed: Mar. 19, 2021

(65) Prior Publication Data

US 2021/0342210 A1     Nov. 4, 2021

(30) Foreign Application Priority Data

Apr. 29, 2020    (IN) .............................. 202041018290

(51) Int. Cl.
     *G06F 11/07*      (2006.01)
     *G06F 11/30*      (2006.01)

(52) U.S. Cl.
     CPC ........ *G06F 11/079* (2013.01); *G06F 11/0772* (2013.01); *G06F 11/0793* (2013.01); *G06F 11/3072* (2013.01)

(58) Field of Classification Search
     CPC ............... G06F 11/079; G06F 11/0772; G06F 11/0793; G06F 11/3072
     See application file for complete search history.

(56) References Cited

U.S. PATENT DOCUMENTS

| 7,200,626 B1 * | 4/2007 | Hoang ................ G06F 11/0751 |
| 10,871,950 B2 * | 12/2020 | De Smet ............ G06F 16/9024 |
| 2016/0110817 A1 * | 4/2016 | Buccetti ................ G06Q 40/08 705/4 |

(Continued)

OTHER PUBLICATIONS

5 Lessons We've Learned Using AWS, Netflix Technology Blog, Dec. 16, 2010, https://netflixtechblog.com/5-lessons-weve-learned-using-aws-1f2a28588e4c.

(Continued)

*Primary Examiner* — Jigar P Patel
(74) *Attorney, Agent, or Firm* — Cantor Colburn LLP

(57) ABSTRACT

The present invention relates to a system and method for supporting application resilience. The objective is to engineer fault awareness and recovery capabilities in an application. The system provides a structured, repeatable and comprehensive approach for addressing resilience of IT systems. Further, it proposes a well-defined set of activities and specifies output for each phase which when integrated into regular SDLC will help systematically build resilience into enterprise applications. The system further optimizes the effort involved using a vulnerability based scoring mechanism that provides the right level of engineering needed based on the applications susceptibility to failures and the impact to the customer's business activities.

16 Claims, 1 Drawing Sheet

(56) References Cited

U.S. PATENT DOCUMENTS

2020/0241978 A1\* 7/2020 Kolli .................. G06F 11/1474
2021/0073060 A1\* 3/2021 Grant .................. G06N 3/0445

OTHER PUBLICATIONS

Christophe Bertrand, "Attaining IT Transformation and Business Resiliency with Dell Technologies", The Enterprise Strategy Group, Inc, Jun. 2020.
IBM Services, 3 ways to enhance IT resiliency and businesscontinuity, Apr. 14, 2020, https://www.ibm.com/blogs/services/2020/04/14/3-ways-to-enhance-it-resiliency-and-business-continuity/.
Introducing Hystrix for Resilience Engineering, by Netflix Technology Blog, Nov. 26, 2012, https://netflixtechblog.com/introducing-hystrix-for-resilience-engineering-13531c1ab . . . .
The Netflix Simian Army. Keeping our cloud safe, secure, by Netflix Technology Blog, Jul. 19, 2011, https://netflixtechblog.com/the-netflix-simian-army-16e57fbab116?gi=e85f441aa658.

\* cited by examiner

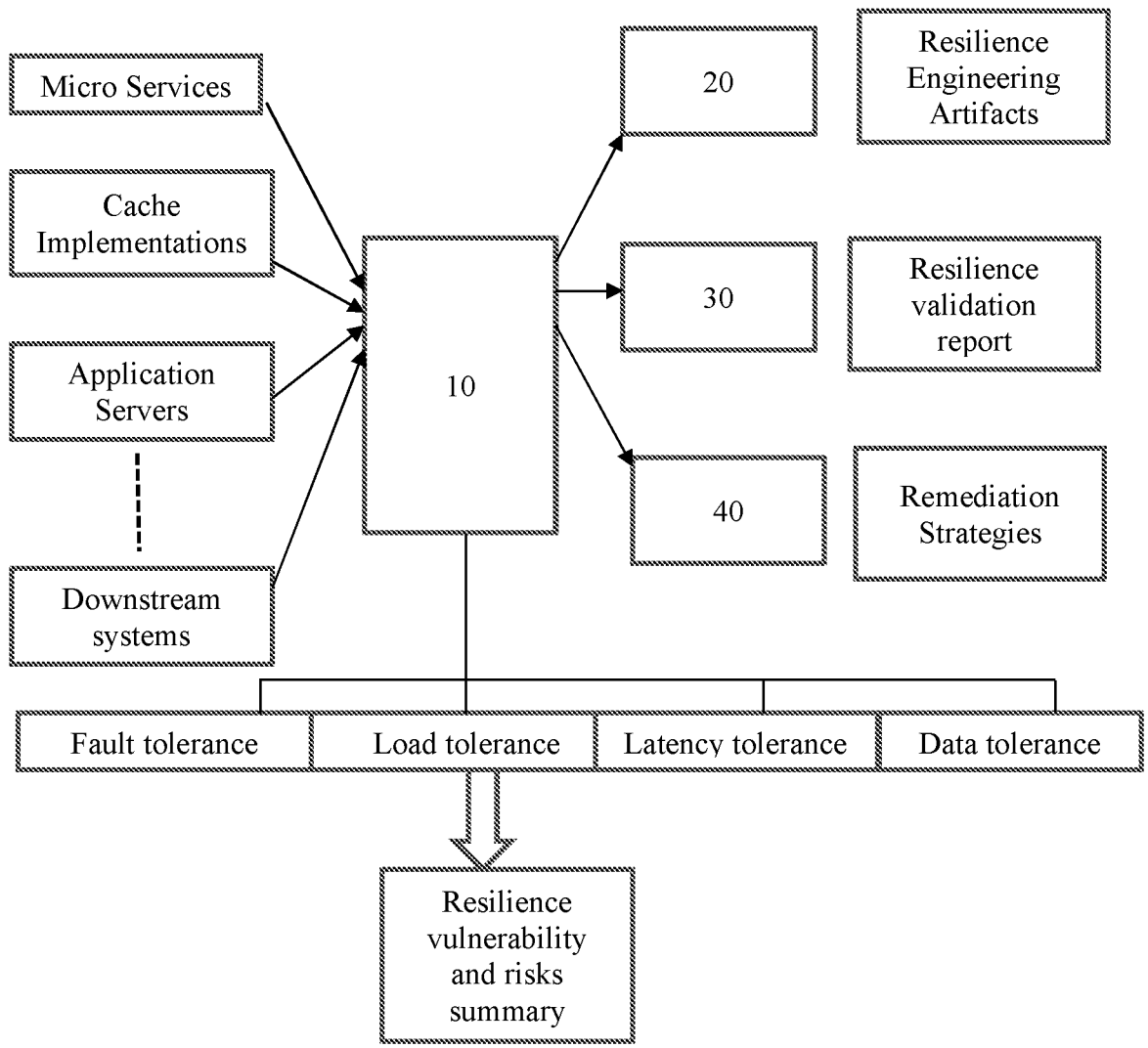

SYSTEM AND METHOD FOR SUPPORTING RESILIENCE IN IT ENVIRONMENT

CROSS REFERENCE TO RELATED APPLICATION

This application is related to and claims the benefit of Indian Patent Application Number 202041018290 filed on Apr. 29, 2020, the contents of which are herein incorporated by reference in their entirety.

FIELD OF INVENTION

The subject matter described herein, in general, relates to support in business resiliency, and, in particular, relates to recovery of components within an IT eco system in event of any fault or failure for supporting business resiliency.

BACKGROUND OF INVENTION

Resilience is defined as the ability to bounce back and recover from difficulties. In the context of IT, it is the ability to quickly recover to an operable state post failure. To that effect, many strategies have been employed over decades namely high availability, disaster recovery and business continuity planning all with a view to ensure continued business operations during failure. While the strategies mentioned above have been heavily focused on the availability of infrastructure or the platforms hosting the application, Resilience Engineering as a discipline is about engineering applications with an intelligence to understand various types of failures in their operational eco-system, decide alternate paths for continued operations and rectify failures (self-heal) on its own.

Generally speaking, the idea of engineering applications that are fault-aware, fault-tolerant and self-healing is in the nascent stages of adoption with most early adopters coming from predominantly technology focused organizations like Netflix and Google. The fact that every business is a technology business and the face of every business is an application in the hands of a customer, availability and responsiveness have become paramount in determining customer experience thereby impacting conversion rates, brand image and customer retention. Despite this, the approach to manage resilience engineering in businesses is quite fragmented, isolated, and covered in parts during various Non-Functional Testing phases: Performance testing/engineering practices covering failover and clustering capabilities, disaster recovery and OAT (operational acceptance testing) validating the operational readiness of the software.

While some organizations have tried to engineer resilience into applications through code libraries that implement specific resilience design patterns, they fail to leverage a comprehensive framework to study, evaluate and identify areas of the enterprise that needs to embrace resilient practices as a discipline. They also fail to provide adequate guidance to determine applicability of resilient design patterns and libraries to existing applications and platforms.

Further, the given techniques fail to represent a comprehensive approach to resilience engineering, i.e. engineering fault awareness and recovery capabilities. Mitigation strategies are often left to individual decisions, rather than use of a structured approach to understand and quantify the risk of failure and provide a view to tolerate and recover from the same. In the background of foregoing limitations, there exists a need for a system and method that is adept at addressing end-to-end resilience of IT systems at both application and infrastructure level.

OBJECTS OF THE INVENTION

The primary object of the present disclosure is to provide a system and method for supporting resiliency of IT systems in face of any fault or failure.

Another object of this disclosure is to provide a system and method for comprehensively implementing specific resilience design patterns to areas of enterprise embracing resilient practices.

Yet another object of the disclosure is to provide a system and method capable of providing adequate guidance in determination of applicability of resilient design patterns and libraries to existing applications and platforms.

Yet other object of the present disclosure is to provide a highly dynamic, structured and repeatable system and method for addressing resilience of IT systems in all aspects, right from application to infrastructure level.

In yet another object, the disclosure provides an economized system and method of supporting resilience that provides an end-to-end coverage spanning from application, to underlying technologies and processes within a computing environment.

In still another object of present disclosure, the system and method is capable of defining a well-defined set of activities and specifying output for each phase within a software development life cycle to build resilience into enterprise applications.

In one other object of present disclosure, the system and method further facilitates for an optimized scoring mechanism that provides the right level of engineering required based on applications susceptibility to failures and the impact to the customer's business activities.

In yet another object of present disclosure, the system and method validates all vulnerabilities identified during fault vulnerability analysis to be addressed during appropriate phase to ensure recovery and remediation at all levels.

These and other objects will become apparent from the ensuing description of the present invention.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Briefly described, in a preferred embodiment, the present disclosure overcomes the above-mentioned disadvantages, and meets the recognized need by providing a system for application resilience in a computing environment. Accordingly, the system comprises of an analysis module configured to assess inadequacies of the application executing in the computing environment based on predetermined parameters, compute a risk index for each of the inadequacy based on a vulnerability score and probability of failure, and prioritize the inadequacies based on the risk index and associated constraints. Now, the engineering module is configured to construct and embed design patterns in the system for addressing the prioritized inadequacies. The validation module, then, validates the design patterns effectiveness in addressing the prioritized inadequacies against a quantifiable expectation defined for the application.

In one aspect of the disclosure, wherein the inadequacies comprise of faults, extended latencies, inconsistent load or data, risks or combination thereof.

In another aspect of the disclosure, the system comprises of a remediation module for rectification of the assessed inadequacies by providing guidance on the code or configuration changes required and operational steps that can be practiced.

BRIEF DESCRIPTION OF THE DRAWINGS

FIG. 1 is a block diagram of a system implementing the application resilience, in accordance with a preferred embodiment of the present disclosure.

DETAILED DESCRIPTION OF THE EMBODIMENTS

In describing the preferred and alternate embodiments of the present disclosure, specific terminology is employed for the sake of clarity. The disclosure, however, is not intended to be limited to the specific terminology so selected, and it is to be understood that each specific element includes all technical equivalents that operate in a similar manner to accomplish similar functions. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

The present disclosure is described below with reference to methods and systems in accordance with general embodiments for supporting resilience within an IT eco-system. The instructions may be loaded into the system, which when executed upon such a computer-implemented system—a general purpose computer or a special purpose hardware-based computer systems, creates means for training the system and implementing functions of various modules hosted by the system.

According to its major aspects as broadly stated, the present disclosure in its preferred form provides a system composed of various modules and sub-modules that help to build resilient IT systems in a structured and comprehensive fashion. More precisely, as shown in FIG. 1, the system comprises of an analysis module, an engineering module, a validation module and a remediation module. Functionally, these modules are configured with specific tasks and processes to achieve an overall objective of addressing resilience of IT systems. Overall, the system provides a structured, repeatable and comprehensive approach for addressing resilience of IT systems. Starting with the business process being implemented, the disclosure spans the application, the underlying technologies and support processes to provide an end-to-end coverage to IT system resilience. This focus on all tenets of the IT systems ensures that resilience is built into all aspects of the IT landscape, instead of adopting a narrow approach of improving resilience only at an application or infrastructure level.

By applying a structured, consistent, automated approach to improve application resilience, IT organizations can reduce the spending, reduce production failures and its impact, increase repair accuracy, and minimize application debt across the portfolio. This can eventually free up the budget for more strategic business imperatives. Orchestrating and industrializing such journey demands a platform-based approach and paves way for the development of application resilience supporting system and method of present disclosure.

In one exemplary approach, the system seamlessly integrates into every phase of software development life cycle (SDLC) irrespective of the methodology (Agile, Waterfall) adopted. This system, with a well-defined set of activities and output for each phase, when integrated into a regular SDLC assists in systematically building resilience into enterprise applications. The system, in order to prevent over-engineering of applications, adopts a fault vulnerability based scoring mechanism through a defined Fault-Vulnerability Analysis (FVA) engine that helps to define the optimal level of engineering needed based on the application's vulnerability to failures and the impact to the customer's business.

Referring now to FIG. 1, a functional block diagram of system 100 for supporting application resilience is illustrated. In general, the system 100 comprises of an analysis module 10, an engineering module 20, a validation module 30, and a remediation module 40. The system 100 along with its various components and sub-components improves end-to-end application support and maintenance by applying resilient design patterns and libraries to applications and underlying platforms.

Next, functions of various modules is proposed. Broadly, the analysis module 10 is configured to assess the vulnerability of fault in the IT system from a resilience perspective, to faults in each of the components. It examines the risks posed to the platforms/applications due to faults, extended latencies, inconsistent load patterns and inconsistent data. An example of such applications include, though not limited to, micro services, cache implementations, application servers, downstream systems etc., as shown in FIG. 1.

The module 10 identifies, ranks and provide mitigation strategies to risk of failures in applications as part of engineering resilience. Particularly, this exercise assesses resiliency and reliability capability, risks and inadequacies of the application and its constituent components, prioritizes them based on available controls, impact of each risk posed on the platforms/applications under study and resulting impact on the user experience. Based on the outcome of the exercise, module 10 prescribes various strategies that must be followed in the subsequent stages—engineering stage, validation stage and remediation stage.

Thereafter, the engineering module 20 typically overlaps with architecture, design and construction phases of the developmental life cycle. The module 20 prescribes various architecture and design patterns that needs to be embedded in the platforms/applications under study creating tolerances according to the specifications desired. Following this, the validation module 30 of system 100 proposes strategies for validating all design patterns built into the systems using automated resilience validation and advanced war-gaming techniques to address the inadequacies against the defined expectations of the application. This stage typically occurs after the testing phases in the SDLC and often overlaps with operational readiness testing phases.

Finally, the remediation module 40 advocates strategies that needs to be followed for better operational practices during production readiness testing continuing on to production. Strategies for operational preparedness, management of appropriate level of monitoring and alerting, maintenance of operational procedures, production war gaming exercises are prepared and implemented at this stage to improve operational reliability of the application/platforms.

Drawing from above, each of the modules of system 100 is discussed in sufficient detail and how these modules are integrated into various phases of the SDLC irrespective of methodology (Agile, or Waterfall) adopted.

Accordingly, the analysis module 10 performs an in-depth analysis of the components of platforms/applications to identify all vulnerabilities. To begin with, these platforms/applications are decomposed into constituent components. Each component of the system is analyzed in depth based on a set of predetermined parameters identifying all potential failure points. For example, the parameters may comprise of impact a component has on end user based on application responsiveness and availability as seen by the end user. Further, it includes impact on components of application as may be determined from the load on the component and utilization of underlying resources like CPU, memory etc., failure detection capability as may be measured by MTTD (mean time to detect). Other significant parameters include failure isolation capability as observable by ability of the system to track and control spread of faults or other inadequacies to other components from infected ones. Further, another parameter may be effectiveness in recovery from given inadequacy as can be measured by MTTR (mean time to repair).

In accordance with one exemplary embodiment, a process centric view can also be taken at this stage. A larger business process is broken down into lower level sub processes. Each of the component now undergoes a rigorous study for potential failure points, failure modes and potential causes contributing to each failure for understanding behavior of system—fault, load, latency or data. Further, strength of controls of the platforms/applications—detection, isolation and remediation capabilities—and resultant effects are analyzed.

The functioning of analysis module 10 includes understanding upstream/downstream components of the system including their dependencies, relations and mappings, and their ability to work around the failure based on detailed analysis of application deployment architecture and interfaces, followed by its evaluation against predefined set of analysis rules, as will be defined and discussed later. The module 10 further performs modeling to understand the capacity and capability of platforms/applications to handle additional load (in case of clusters, failover etc.) based on application architecture, thoroughness of the business processes and alternatives defined in an event of failure, isolation capabilities, and availability of monitoring and remediation processes.

This failure data and analysis information is then correlated with the probability of occurrence of each failure and the history of occurrences for the given application based on deployment features like clustering, nature of component (say for example, type of server) and historical information regarding the failures of component. This analysis then culminates in a prioritized list of potential failures based on Fault Risk Index (FRI) (discussed later).

In accordance with one specific embodiment of present disclosure, activities involved comprises of: identifying potential failure points in the platforms/applications, and for each potential failure point, determining the following:

a) Critical Steps:
  Potential failure points in the system (failures could be error, faults, hangs, latency, other network/connection issues, I/O, storage issues, hardware issues, resource issues)
  For each potential failure point, determining:—effect on end-user experience (UXE)

"End-User Experience effect (UXE)" is determined based on the impact an end-user of the system experiences as defined in the table 1 below. The end-user may be a human or another system that is dependent on present system.

TABLE 1

| End-User Exp. impact | UXE |
|---|---|
| No noticeable effect | 0 |
| Minor impairment | 0 |
| Performance degradation | 1 |
| Moderate reduction of functionality | 1 |
| Major impairment of core functionality or data loss | 2 |
| Full service outage/data loss | 2 |

Impact due to upstream or downstream systems—"Upstream_Downstream Score (UDS)" is based on the impact the system or the service faces due to another service or system either upstream or downstream being impacted by a fault as defined in table 2 below:

TABLE 2

| Upstream_Downstream Impact | UDS |
|---|---|
| No noticeable effect | 0 |
| Minor impairment | 0 |
| Performance degradation | 1 |
| Moderate reduction of functionality | 1 |
| Major impairment of core functionality or data loss | 2 |
| Full service outage/data loss | 2 | b) Computation of vulnerability score for each failure point, based on above impacts: vulnerability score is computed based on various factors that render a system vulnerable to failures as indicated in the formula below. Each factor carries a weightage that can be configured based on the architecture and complexity of the system under evaluation for resiliency.

The below formula helps understand how the Vulnerability score is calculated:

$$\text{Vulnerability Score }(V) = (0.1 * \text{Detection Score} + 0.2 * \text{Isolation Score} + 0.1 * \text{Fallback Score} + 0.2 * \text{Recovery Score} + 0.2 * UXE + 0.2 * UDS),$$

where

"Detection Score" is based on the system's ability to detect a fault as indicated in table 3 below with a configured weight of 10%:

TABLE 3

| Time to Detect | Detection Score |
|---|---|
| Up to 15 min | 0 |
| More than 15 min | 1 |
| No Detection setup | 2 |

"Isolation score" is based on the system's ability to isolate a fault as indicated in table 4 below with a configured weight of 20%:

TABLE 4

| Time to isolate | Isolation Score |
|---|---|
| No Isolation setup | 2 |
| Up to 15 min | 0 |
| More than 15 min | 1 |

"Fallback score" is based on the system's ability to operate on an alternate path to continue to provide services as indicated in table 5 below with a configured weight of 10%:

TABLE 5

| Time to Fallback | Fallback Score |
|---|---|
| Immediate | 0 |
| Up to 15 min | 1 |
| More than 15 min | 2 |

"Recovery score" is based on the system's ability to recover from a fault and continue to provide services as indicated in table 6 below with a configured weight of 20%:

TABLE 6

| Time to Recover | Recovery Score |
|---|---|
| Automatic or Within 15 min | 0 |
| Up to 45 min | 1 |
| More than 45 min | 2 |

"End-User Experience effect (UXE)" is based on the impact an end-user of the system experiences as defined in table 7 below with a configured weight of 20%. The end-user may be a human or another system that is dependent on present system, as discussed above.

TABLE 7

| End-User Exp. impact | UXE |
|---|---|
| No noticeable effect | 0 |
| Minor impairment | 0 |
| Performance degradation | 1 |
| Moderate reduction of functionality | 1 |
| Major impairment of core functionality or data loss | 2 |
| Full service outage/data loss | 2 |

"Upstream_Downstream Score (UDS)" is based on the impact the system or the service faces due to another service or system either upstream or downstream being impacted by a fault as defined in table 8 below with a configured weight of 20%:

TABLE 8

| Upstream_Downstream Impact | UDS |
|---|---|
| No noticeable effect | 0 |
| Minor impairment | 0 |
| Performance degradation | 1 |
| Moderate reduction of functionality | 1 |
| Major impairment of core functionality or data loss | 2 |
| Full service outage/data loss | 2 | c) Illustrating FVA: In accordance with one exemplary embodiment, various component types, failure categories, failure description and vulnerability score is illustrated in Tables 9, 10 and 11 below.

TABLE 9

| | | Potential Failure Mode | | |
|---|---|---|---|---|
| F. NO | Component Type | Failure Category Name | Failure Description | Vulnerability Score |
| 1 | Web Server | Crash | Hardware Failure-Single Server | 0.3 |
| 2 | Web Server | Hang | Hardware Issues Causing Hang-Single Server | 0.7 |
| 3 | Web Server | Hang | Software Component Issues Causing Hang-Single Server | 0.7 |
| 4 | Web Server | Resource Limit | Hardware Resource Limit-CPU Maxed Out | 1.1 |
| 5 | Web Server | Latency | Network link slowness between Apache Server and App Server | 1.1 |
| 6 | Web Server | Latency | Slowness issue on App Server | 1.1 |

TABLE 10

| | | Potential Failure Mode | | |
|---|---|---|---|---|
| F. NO | Component Type | Failure Category | Failure Description | Vulnerability Score |
| 1 | App Server | Crash | Hardware Failure-Single Server | 0.6 |
| 2 | App Server | Crash | Software Component Failure-Multi Server | 0.7 |
| 3 | App Server | Hang | Hardware Issues Causing Hang-Single Server | 0.7 |
| 4 | App Server | Hang | Software Component Issues Causing Hang-Single Server | 0.7 |
| 5 | App Server | Resource Limit | Hardware Resource Limit - Disk Memory Full | 1.1 |
| 6 | App Server | Latency | Slowness issue on DB Server | 1.1 |

TABLE 11

| F. NO | Component Type | Failure Category | Failure Description | Vulnerability Score |
|---|---|---|---|---|
| | | | Potential Failure Mode | |
| 1 | Database Server | Crash | Hardware Failure-Primary Server | 0.5 |
| 2 | Database Server | Crash | Software Component Failure-Primary Server | 0.7 |
| 3 | Database Server | Hang | Hardware Issues Causing Hang-Single Server | 1.5 |
| 4 | Database Server | Hang | Software Component Issues Causing Hang-Single Server | 1.5 |
| 5 | Database Server | Resource Limit | Hardware Resource Limit - CPU Maxed Out | 1.1 |
| 6 | Database Server | Resource Limit | Hardware Resource Limit - Disk Memory Full | 1.1 | d) Work products

FVA analysis and finalized score for each component
Detailed vulnerability and effect report The analysis module 10 is configured to understand business process that is being implemented by the IT system. This is followed by componentization of the IT system into different components for e.g. Web/App, DB, Network, Cache, Microservices, $3^{rd}$ party services, etc. The module 10 then performs a Fault Vulnerability Analysis (FVA) across the four dimensions of failure viz. Fault, Latency, Load and Data. For every fault vulnerability, the framework assigns a Fault Risk Index (FRI) based on the below formula and prioritized in the descending order of FRI i.e. focus is on components having the highest probability of failure and highest impact of failures on the system to calculate FRI:

$$FRI = (V * P)$$

where

P—Probability of failure of the component and
V—Vulnerability Score for the failure determined from impact on product due to failure computed as cost of failure.

TABLE 12

| MTBF | Stability Index(SI) |
|---|---|
| Greater than 2 week | 0.2 |
| between 7-13 days | 0.3 |
| between 4-6 days | 0.5 |
| between 1-3 days | 0.75 |
| less than 1 day | 1 |

Failure Index (FI) is based on the redundancy of the component and its ability to continue service in the event of failure as defined below:

| Redundancy | Failure Index(FI) |
|---|---|
| Yes | 1 |
| No | 0.1 |

In one working embodiment of present disclosure, the Fault Risk Index (FRI) is illustrated in Table 13 below:

TABLE 13

| | | | Potential Failure Mode | | | |
|---|---|---|---|---|---|---|
| F. NO | Component Type | Failure Category Name | Failure Description | Vulnerability Score | Probability | FRI |
| 1 | Web Server | Crash | Hardware Failure-Single Server | 0.3 | 0.05 | 0.015 |
| 2 | Web Server | Hang | Hardware Issues Causing Hang-Single Server | 0.7 | 0.05 | 0.035 |
| 3 | Web Server | Hang | Software Component Issues Causing Hang-Single Server | 0.7 | 0.1 | 0.07 |
| 4 | Web Server | Resource Limit | Hardware Resource Limit-CPU Maxed Out | 1.1 | 0.25 | 0.275 |
| 5 | Web Server | Latency | Network link slowness between Apache Server and App Server | 1.1 | 0.05 | 0.055 |
| 6 | Web Server | Latency | Slowness issue on App Server | 1.1 | 0.25 | 0.275 |

While computation of vulnerability score has already been discussed in earlier sections, the below section details how a probability of failure for a component is derived.

Probability of failure $(P) = 0.7 *$ Stability Index $(SI) + 0.3 *$ Failure Index $(FI)$ where Stability Index (SI) is based on the historical stability of the component and is arrived at by using table 12 below:

Next, the working of engineering module 20 is discussed in detail. Based on the output of FVA, different design and implementation patterns are identified for addressing the vulnerabilities.

For each prioritized failure or fault vulnerability, an alternate path called as Tolerance logic, and a remediation logic is identified. During the development and testing phases, tolerance logic and the remediation logic in the application is implemented either through adoption of resilience design patterns or frameworks or through custom code. Optimal design patterns are derived from a "Resilience architecture and design pattern catalog" after a comprehensive review of corresponding usage scenarios.

Resilience code constructs are introduced into the software libraries using custom frameworks or automated tools as applicable. The automated tool is configured to inspect the application code and wrap the specified function calls using resilience constructs. This helps to introduce these constructs into existing code libraries without the need for manual code changes. The design and implementation of observability constructs are reviewed and aligned with proposed monitoring, tolerance and remediation mechanisms to meet expected service level objectives.

Accordingly, in one exemplary embodiment, Netflix Hystrix library is utilized to support resiliency patterns (support and incorporate/add latency and fault tolerance) to failures in the system. Thus, resiliency patterns including bulkheads, circuit breaker, latency timeout, fallback and fail silently, fail fast and rapidly recover, retry and escalations are supported by present framework. Some of the other resilience patterns include: fallbacks for critical service/API with defined capacity to meet the target SLA (response/availability/latency), fail fast and recover early patterns.

Next, the validation module 30 validates the above processes using resilience testing through any resilience validation platform, Netflix Simian Army and other such techniques. The module 30 ensures that all vulnerabilities identified in the analysis module 10 have been addressed as part of the engineering phase in the engineering module 20. This involves a structured validation process, where different faults are induced into the platforms/applications, and the system behavior is observed. The detection, isolation and recovery capabilities of the components are validated against the expected behavior. The monitoring, management and recovery tools/procedures are also validated in a production-like setup, ensuring that all levels of remediation/recovery are in place.

In accordance with one exemplary embodiment, a validation strategy to validate various tenets is illustrated in Table 14 below.

TABLE 14

| Tenet | Component | Test Strategy | Key Metrics |
|---|---|---|---|
| Fault tolerance- Outages | Hardware Network Containers Application Integration points | Introduce failure manually/automatically Observe time to discovery Cascading Failures Chain Reactions Fault isolation behavior Recovery behavior Validate transaction semantics | Error rate Response time fluctuations Utilization metrics Time to discovery |
| Load tolerance | Network Hardware Containers Application Interfaces 3rd Party components | Load introduction Observe time to discovery Observe capacity adjustments Study load shedding patterns | Time to discovery Utilization metrics Time required for commissioning additional resources Error rates Response times |

TABLE 14-continued

| Tenet | Component | Test Strategy | Key Metrics |
|---|---|---|---|
| Latency tolerance | Network Hardware Containers Application Interfaces 3rd Party components | Introduce additional latencies Observe time to discovery Fault isolation behavior Recovery Behavior Study cascading effects and resource pool saturation | Utilization Metrics Time to discovery Response time deviations |
| Data tolerance | Containers Applications Interfaces | Identify boundary conditions like data volume, outlier and erroneous conditions Configure stubs to simulate incorrect data Observe behavior | Downtime Error message validation |

In furtherance, the remediation module 40 implements the remediation logic for rectification of assessed inadequacies by providing guidance on code or configuration changes required and operational steps that can be practiced. This is achieved either through custom application code, Infrastructure as a Code strategies, monitoring tools for auto rectification or manual rectification. It ensures application reliability in production and these would typically include strategies that go beyond application architecture/design and monitoring/management strategies. Self-healing and self-protecting mechanisms like Automated Standard Operating Procedures (SOP), Accelerate Root Cause Analysis (RCA) and Optimized auto scaling policies are introduced into the operating environment. These are defined for all areas ranked as highly critical in the analysis module 10. These remediation strategies provided an additional layer of protection to these platforms/applications.

In one exemplary embodiment, below table 15 illustrates the multiple remediation strategies for one of the failure modes.

Failure Mode: App Server Crash—Software Component Failure (Multi Server)

TABLE 15

| Remediation I | Auto-scaling | Configure auto-scaling for the components hosted on the App server so that they can be brought up on another POD in case of failures |
|---|---|---|
| Remediation II | Circuit breaker, timeout and retry | Configure circuit breaker, timeout and retry patterns in the upstream application, so that in case of crash, there is a fail-fast and retry |
| Remediation III | Caching | Configure caching in the upstream system as applicable, so that in case of failure, data from the cache is used |
| Remediation IV | Monitor and Recycle | Implement monitoring for all App server instances and recycle server instances on a regular basis/in-case of any monitoring parameters show abnormal values |

The foregoing description is a specific embodiment of the present disclosure. It should be appreciated that this embodiment is described for purpose of illustration only, and that those skilled in the art may practice numerous alterations and modifications without departing from the spirit and scope of the invention. It is intended that all such modifications and alterations be included insofar as they come within the scope of the invention as claimed or the equivalents thereof.

We claim:

1. A system for application resilience in a computing environment, comprising:
a special purpose hardware-based computer system for:
assessing inadequacies of the application executing in the computing environment based on predetermined parameters;
computing a fault risk index for each of the inadequacy based on a vulnerability score and probability of failure; and
prioritizing the inadequacies based on the fault risk index and associated constraints;
constructing and embedding optimal design patterns into the computing environment for addressing the prioritized inadequacies, wherein the optimal design patterns are derived from a resilience architecture and design pattern catalog, and wherein the design patterns are constructed and embedded into the computing environment by inspecting existing code within the computing environment, wrapping specified function calls using resilience constructs, and injecting or suggesting correct piece of code or configurations into the existing code within the computing environment; and
validating the design patterns effectiveness in addressing the prioritized inadequacies against a quantifiable expectation defined for the application.

2. The system for application resilience, as claimed in accordance with claim 1, wherein the inadequacies comprises of faults, errors, hangs, network issues, input/output storage issues, resource issues, extended latencies, inconsistent load or data, risks or combination thereof.

3. The system for application resilience, as claimed in accordance with claim 1, wherein the analysis module is further configured to decompose the application into constituting components for assessing the inadequacies.

4. The system for application resilience, as claimed in accordance with claim 1, wherein the predetermined parameters comprises of impact on end user, impact on components of the application, failure detection capability, failure isolation capability, effectiveness in recovery, or a combination thereof.

5. The system for application resilience, as claimed in accordance with claim 3, wherein the vulnerability score of each of the constituting component of the application is computed based on detection score, isolation score, fallback score, recovery score, end user experience effect (UXE) and upstream-downstream score (UDS) or a combination thereof along with associated weights.

6. The system for application resilience, as claimed in accordance with claim 1, wherein the probability of failure is derived from stability index and failure index, associated with predefined weights.

7. The system for application resilience, as claimed in accordance with claim 3, wherein detection, isolation, recovery capabilities, monitoring, management and recovery tools and procedures are validated for the inadequacies.

8. The system for application resilience, as claimed in accordance with claim 1, further comprising a remediation module for rectification of the prioritized inadequacies, by providing guidance on code or configuration changes required and operational steps to be practiced.

9. A method for application resilience in a computing environment, comprising:
assessing inadequacies of the application executing in the computing environment based on predetermined parameters;
computing a fault risk index for each of the inadequacy based on a vulnerability score and probability of failure; and
prioritizing the inadequacies based on the fault risk index and associated constraints;
constructing and embedding optimal design patterns into the computing environment for addressing the prioritized inadequacies, wherein the optimal design patterns are derived from a resilience architecture and design pattern catalog, and wherein the design patterns are constructed and embedded into the computing environment by inspecting existing code within the computing environment, wrapping specified function calls using resilience constructs, and injecting or suggesting correct piece of code or configurations into the existing code within the computing environment; and
validating the design patterns effectiveness in addressing the prioritized inadequacies against a quantifiable expectation defined for the application.

10. The method for application resilience in a computing environment, as claimed in accordance with claim 9, wherein the inadequacies comprises of faults, errors, hangs, network issues, input/output storage issues, resource issues, extended latencies, inconsistent load or data, risks or combination thereof.

11. The method for application resilience in a computing environment, as claimed in accordance with claim 9, wherein the application is decomposed into constituting components for assessing capability and inadequacies thereof.

12. The method for application resilience in a computing environment, as claimed in accordance with claim 9, wherein the predetermined parameters comprises of impact on end user, impact on components of the application, failure detection capability, failure isolation capability, effectiveness in recovery, or a combination thereof.

13. The method for application resilience in a computing environment, as claimed in accordance with claim 11, wherein the vulnerability score of each of the constituting component of the application is computed based on detection score, isolation score, fallback score, recovery score, end user experience effect (UXE) and upstream-downstream score (UDS) or a combination thereof along with associated weights.

14. The method for application resilience in a computing environment, as claimed in accordance with claim 9, wherein the probability of failure is derived from stability index and failure index, associated with predefined weights.

15. The method for application resilience in a computing environment, as claimed in accordance with claim 11, wherein detection, isolation, recovery capabilities, monitoring, management and recovery tools and procedures are validated for the inadequacies.

16. The method for application resilience in a computing environment, as claimed in accordance with claim 9, further comprising rectification of the assessed inadequacies, by providing guidance on code or configuration changes required and operational steps to be practiced.

* * * * *